(12) United States Patent
Minami et al.

(10) Patent No.: US 12,507,622 B2
(45) Date of Patent: Dec. 30, 2025

(54) CUTTER BLADE AND LAWN MOWER

(71) Applicant: HONDA MOTOR CO., LTD., Tokyo (JP)

(72) Inventors: Fumio Minami, Wako (JP); Tatsuya Yamazaki, Wako (JP); Taichi Kubota, Wako (JP); Yuko Nishi, Wako (JP); Shin Murakami, Wako (JP); Kento Kimura, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 492 days.

(21) Appl. No.: 18/088,813

(22) Filed: Dec. 27, 2022

(65) Prior Publication Data

US 2024/0206386 A1   Jun. 27, 2024

(51) Int. Cl.
| | | |
|---|---|---|
| *A01D 34/73* | (2006.01) | |
| *A01D 34/68* | (2006.01) | |
| *A01D 101/00* | (2006.01) | |

(52) U.S. Cl.
CPC .............. *A01D 34/73* (2013.01); *A01D 34/68* (2013.01); *A01D 2101/00* (2013.01)

(58) Field of Classification Search
CPC .... A01D 34/73; A01D 34/68; A01D 2101/00; A01D 34/733; A01D 34/736
See application file for complete search history.

(56) References Cited

U.S. PATENT DOCUMENTS

| | | | | |
|---|---|---|---|---|
| 3,014,330 | A | * | 12/1961 | Oberdick .............. A01D 43/063 |
| | | | | 56/16.6 |
| 5,732,540 | A | | 3/1998 | Samejima et al. |
| 9,888,626 | B2 | * | 2/2018 | Gilpatrick ............ A01D 34/733 |
| 11,044,846 | B2 | | 6/2021 | Kelly |
| 11,246,260 | B2 | * | 2/2022 | Xu .......................... A01D 69/02 |
| 2019/0307059 | A1 | * | 10/2019 | Hong ..................... G05D 1/0238 |
| 2024/0107939 | A1 | * | 4/2024 | Feng ..................... A01D 34/733 |

FOREIGN PATENT DOCUMENTS

JP          3582878          9/1996

* cited by examiner

*Primary Examiner* — Joseph M Rocca
*Assistant Examiner* — Jose Antonio Martinez
(74) *Attorney, Agent, or Firm* — Amin, Turocy & Watson, LLP

(57) ABSTRACT

A cutter blade of a lawn mower includes an attachment portion, a first arm portion, and a second arm portion. The first arm portion includes a first blade portion. The second arm portion includes a second blade portion. In a horizontal placement state in which the cutter blade is placed in a manner so that a rotation center line of the cutter blade extends along a vertical direction, a position of a first portion of the first blade portion in the vertical direction and a position of a second portion of the second blade portion in the vertical direction are different from each other. A distance from the rotation center line to the first portion and a distance from the rotation center line to the second portion are equal to each other.

9 Claims, 7 Drawing Sheets

CUTTER BLADE AND LAWN MOWER

BACKGROUND OF THE INVENTION

Field of the Invention

The present invention relates to a cutter blade and a lawn mower.

Description of the Related Art

In recent years, research and development have been conducted to contribute to energy efficiency in order to ensure access to affordable, reliable, sustainable and advanced energy for more people. U.S. Ser. No. 11/044,846 B2 discloses a cutter blade which is rotated by a rotary shaft provided in a lawn mower. The cutter blade includes an attachment portion attached to the rotary shaft, and a pair of arm portions protruding from the attachment portion in mutually opposite directions. Each of the pair of arm portions is formed with a blade portion capable of mowing grass on lawns.

SUMMARY OF THE INVENTION

There is a need for cutter blades that can more efficiently shred lawn grass.

An object of the present invention is to meet the above-mentioned need.

According to an aspect of the present invention, there is provided a cutter blade configured to be rotated by a rotary shaft provided in a lawn mower, the cutter blade including: an attachment portion attached to the rotary shaft; and a first arm portion and a second arm portion each extending from the attachment portion in a radially outward direction of the rotary shaft, wherein the first arm portion includes a first blade portion configured to cut grass, the second arm portion includes a second blade portion configured to cut the grass, in a horizontal placement state in which the cutter blade is placed in a manner so that a rotation center line of the cutter blade extends along a vertical direction, a position of a first portion of the first blade portion in the vertical direction and a position of a second portion of the second blade portion in the vertical direction are different from each other, and a distance from the rotation center line to the first portion and a distance from the rotation center line to the second portion are equal to each other.

According to another aspect of the present invention, there is provided a lawn mower including the cutter blade described above.

According to the present invention, it is possible to efficiently shred lawn grass.

The above objects, features, and advantages will be readily understood from the following description of an embodiment with reference to the accompanying drawings.

DETAILED DESCRIPTION OF THE INVENTION

Figure 1:
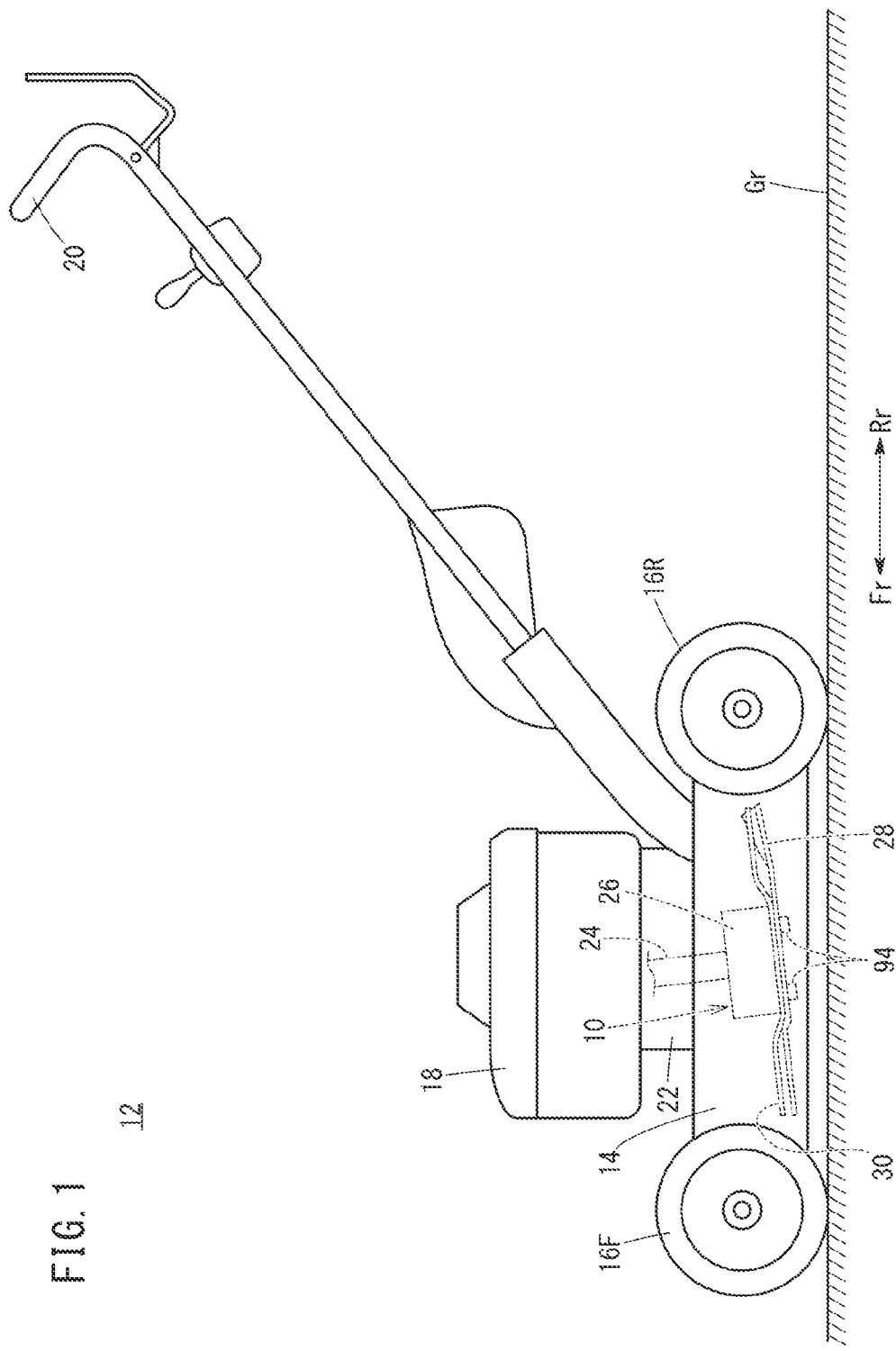
FIG. 1 is a side view of a lawn mower.

A cutter blade 10 and a lawn mower 12 according to an embodiment of the present invention will be described below with reference to the drawings. As shown in FIG. 1, the lawn mower 12 according to the present embodiment is a walk-behind, self-propelled working machine that cuts lawn grass with a rotating cutter blade 10 (rotary blade). In FIG. 1, the direction of arrow Fr indicates the front side of the lawn mower 12, and the direction of arrow Rr indicates the rear side of the lawn mower 12.

The lawn mower 12 includes a housing 14, left and right front wheels 16F, left and right rear wheels 16R, the cutter blade 10, a prime mover 18, and an operation handle 20. The left and right front wheels 16F are disposed on a front side of the housing 14. The left and right rear wheels 16R are disposed on a rear side of the housing 14. The cutter blade 10 is housed in the housing 14. The prime mover 18 is disposed on an upper side of the housing 14. The operation handle 20 extends rearward and obliquely upward from the housing 14.

The lawn mower 12 rotates the cutter blade 10 by the prime mover 18 to thereby cut (mow) lawn grass that is under the lawn mower 12 and further shred the cut lawn grass, which is fragments of the cut grass, with the cutter blade 10. The rotation direction of the cutter blade 10 is a clockwise direction when viewed from above, but is not limited thereto. The shredded grass clippings fall on the ground Gr by gravity and are decomposed into fertilizer. Such a mowing technique is called mulching. The lawn mower 12 may include a lawn storage (not shown) for storing grass clippings.

The housing 14 is a casing in which only a portion facing the ground Gr (lawn) is opened downward. A prime mover base 22 is attached to an upper surface of the housing 14. The prime mover 18 is attached to an upper surface of the prime mover base 22. The lawn mower 12 is equipped with an electric motor as the prime mover 18. The electric motor is driven by electric power supplied from a battery (not shown). Note that the prime mover 18 is not limited to such an electric motor, and may be an engine, for example. The prime mover 18 has a rotary shaft 24 projecting downward and extending into the housing 14. The rotary shaft 24 extends in the direction of gravity so as to be inclined toward the rear of the lawn mower 12.

The cutter blade 10 is coupled to the rotary shaft 24 of the prime mover 18, and is rotated by a rotational driving force transmitted from the rotary shaft 24. Hereinafter, the rotation direction of the cutter blade 10 (the direction of arrow R in FIG. 2) is also referred to as a "blade rotation direction". The direction opposite to the blade rotation direction may be referred to as a "reverse rotation direction".

The cutter blade 10 is attached to the rotary shaft 24 via a blade holder 26. The blade holder 26 is attached to a central portion of the cutter blade 10. The blade holder 26 is coupled to a lower end portion of the rotary shaft 24 coaxially with the rotary shaft 24. Therefore, in the lawn mower 12, the rotation center line al (see FIG. 2) of the cutter blade 10 coincides with the rotation axis of the rotary shaft 24. The rotation center line al of the cutter blade 10 is not necessarily required to coincide with the rotation axis of the rotary shaft 24. For example, the rotation center line al of the cutter blade 10 may be arranged at a position offset in a direction perpendicular to the rotation axis of the rotary shaft 24 and extend in parallel to the rotation axis.

Figure 2:
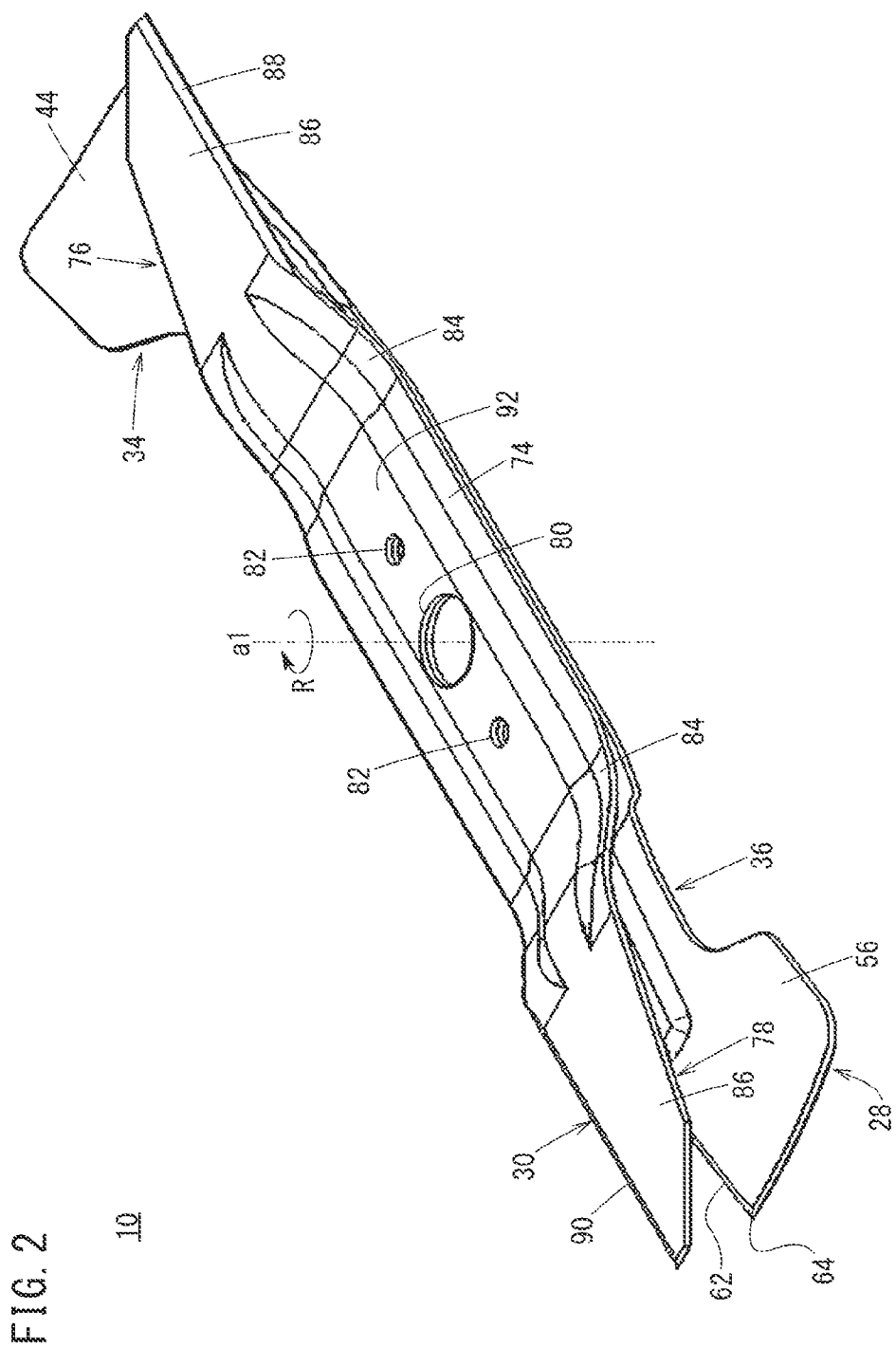
FIG. 2 is a perspective view of a cutter blade of the lawn mower of FIG. 1.
Figure 3:
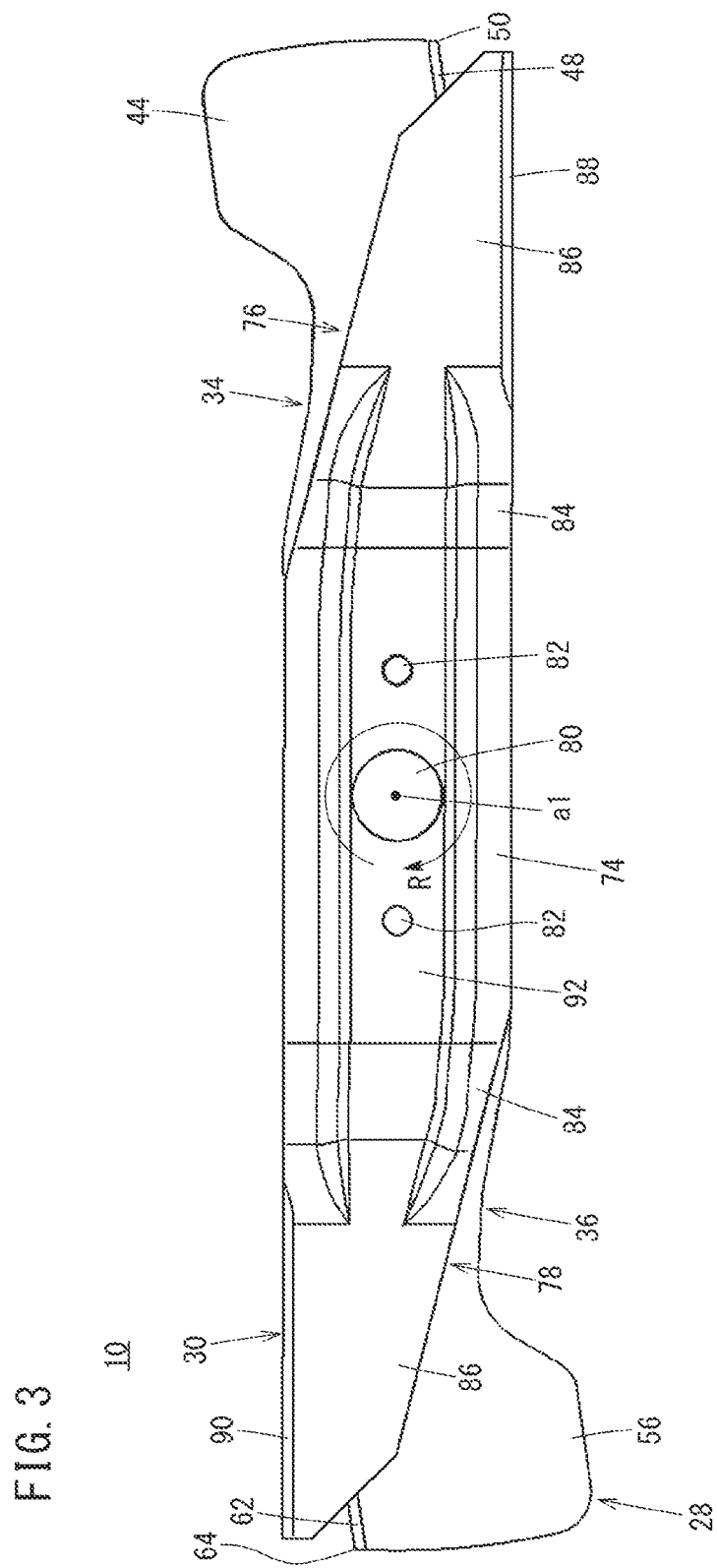
FIG. 3 is a plan view of the cutter blade of FIG. 2.

As shown in FIGS. 2 and 3, the cutter blade 10 includes a lower blade member 28 and an upper blade member 30, which are disposed so as to overlap each other in the thickness direction. Each of the lower blade member 28 and the upper blade member 30 is a plate-shaped elongated member (bar blade) extending in a direction orthogonal to the rotation center line al (the rotary shaft 24 in FIG. 1).

The lower blade member 28 (see FIGS. 4 and 5) is manufactured by, for example, plastically deforming, by press working, a single metal thin plate having a point-symmetric shape. The lower blade member 28 is made of a metal material such as steel, for example. The constituent material of the lower blade member 28 is not limited to a metal material and may be a resin material or the like.

Figure 4:
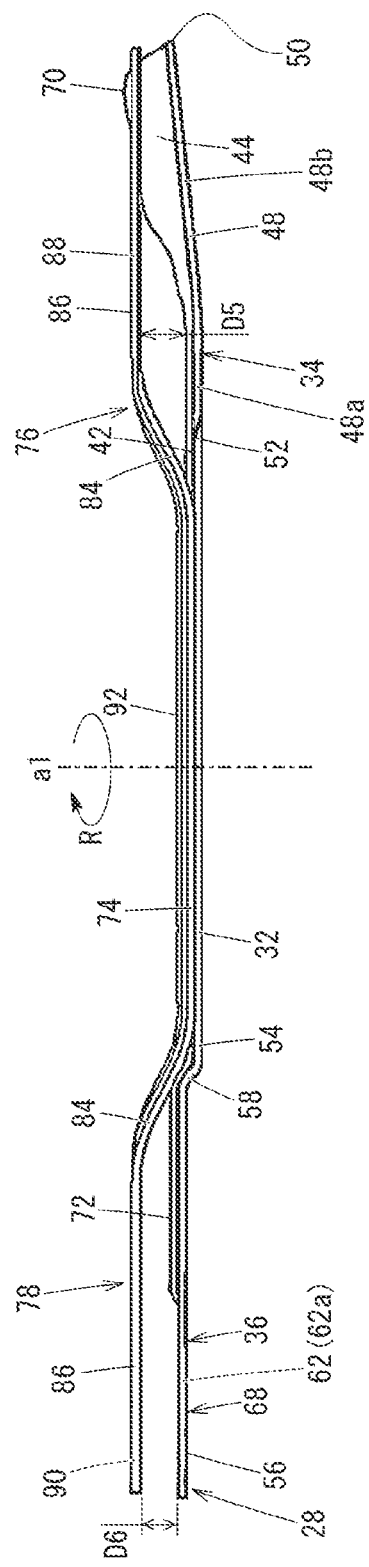
FIG. 4 is a front view of the cutter blade of FIG. 2.
Figure 5:
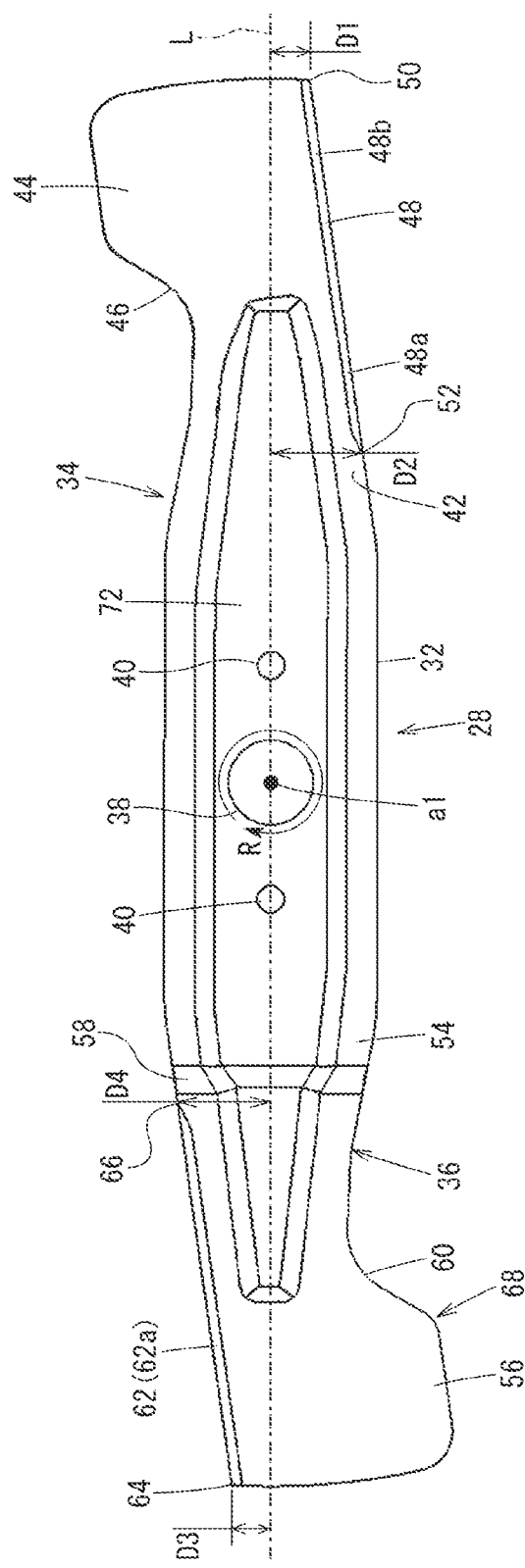
FIG. 5 is a plan view of the lower blade member of FIG. 2.

As shown in FIGS. 4 and 5, the lower blade member 28 includes a lower attachment portion 32 (attachment portion), a first arm portion 34, and a second arm portion 36. The lower attachment portion 32 extends in the direction perpendicular to the rotation center line al of the cutter blade 10 (see FIG. 4). The lower attachment portion 32 is located at a longitudinal center of the lower blade member 28.

As shown in FIG. 5, the lower attachment portion 32 includes a lower insertion hole 38 and a pair of lower attachment holes 40. The lower insertion hole 38 is located at the center of the lower attachment portion 32. The pair of lower attachment holes 40 are positioned so as to sandwich therebetween the lower insertion hole 38 in the longitudinal direction of the lower blade member 28.

The first arm portion 34 and the second arm portion 36 each extend from the lower attachment portion 32 in a radially outward direction thereof. Specifically, the first arm portion 34 and the second arm portion 36 extend in mutually opposite directions with the lower attachment portion 32 being centered. The total weight of the first arm portion 34 is the same as the total weight of the second arm portion 36. The outer dimensions of the first arm portion 34 in a plan view are approximately equal to the outer dimensions of the second arm portion 36 in a plan view.

The first arm portion 34 includes a first arm body 42 (first blade body) and a wing portion 44. The first arm body 42 extends from the lower attachment portion 32 in the radially outward direction. The first arm body 42 extends in the direction orthogonal to the rotation center line al of the cutter blade 10 (see FIG. 4). In FIG. 5, the first arm body 42 is formed to be narrower toward the outer side in the radial direction. The width of the first arm body 42 is a dimension along the blade rotation direction.

The wing portion 44 generates an ascending air current when the lower blade member 28 rotates. The wing portion 44 is connected to an extending end portion of the first arm body 42. The wing portion 44 is formed on a portion including a radially outer end portion (an end portion in the radially outward direction) of the first arm portion 34. The wing portion 44 is formed into a quadrangular shape in plan view. The wing portion 44 protrudes in the reverse rotation direction from a radially outer end 46 of an edge portion (rear edge portion), of the first arm body 42, that faces in the reverse rotation direction.

As shown in FIG. 4, in the horizontal placement state in which the cutter blade 10 is placed such that the rotation center line al of the cutter blade 10 is oriented in the vertical direction, the wing portion 44 is inclined upward toward the radially outward direction. That is, in the state where the cutter blade 10 is horizontally disposed, the first arm portion 34 is inclined upward toward the radially outward direction.

Figure 6:
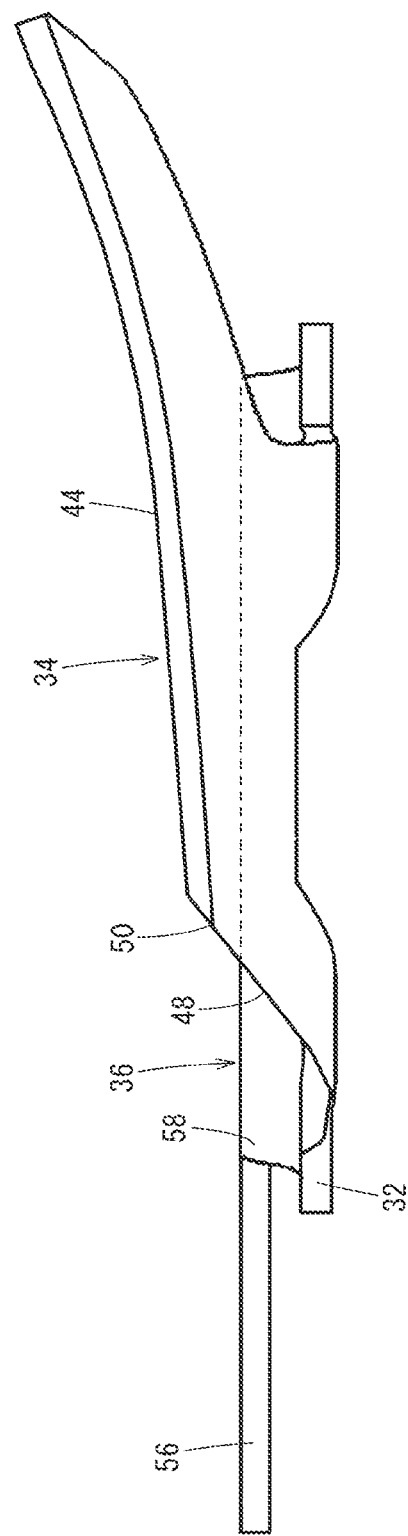
FIG. 6 is a side view of the lower blade member of FIG. 5.

As shown in FIG. 6, in the state where the cutter blade 10 is horizontally disposed, the wing portion 44 is inclined upward toward the reverse rotation direction over the entire width of the wing portion 44. In other words, in the state where the cutter blade 10 is horizontally placed, the wing portion 44 protrudes upward in the reverse rotation direction. The upper surface of the wing portion 44 is curved in an arc shape.

As shown in FIG. 5, a first blade portion 48 capable of cutting grass is formed at an edge portion (front edge portion), of the first arm portion 34, that faces in the blade rotation direction. The first blade portion 48 includes a first base blade 48a and an inclined blade 48b. The first base blade 48a extends in the direction orthogonal to the rotation center line al of the cutter blade 10 (see FIG. 4). The first base blade 48a is formed at a front edge portion of the first arm body 42. In the horizontal placement state of the cutter blade 10, the inclined blade 48b is inclined upward, in a direction from the radially outer end of the first base blade 48a toward the radially outer side (see FIG. 4).

A radially outer end 50 of the first blade portion 48 is offset in the reverse rotation direction from a radially inner end 52 of the first blade portion 48. In other words, the shortest distance D1 between the radially outer end 50 of the first blade portion 48 and a line segment L is shorter than the shortest distance D2 between the radially inner end 52 of the first blade portion 48 and the line segment L. The line segment L is a line segment that extends in the longitudinal direction of the lower blade member 28 and passes through the rotation center line al of the cutter blade 10. In the horizontal placement state of the cutter blade 10, the position of the radially outer end 50 of the first blade portion 48 in the vertical direction is higher than the position of the radially inner end 52 of the first blade portion 48 in the vertical direction (see FIG. 4).

The second arm portion 36 includes a second arm body 54 (second blade body) and a balance portion 56 connected to an extending end portion of the second arm body 54. The second arm portion 36 is not provided with a wing portion. The second arm body 54 extends from the lower attachment portion 32 in a direction opposite to the direction in which the first arm body 42 extends. The second arm body 54 is formed so as to become narrower toward the radially outer side. The width of the second arm body 54 is a dimension along the blade rotation direction.

As shown in FIG. 4, the second arm body 54 is formed with an upward extending portion 58 extending upward in the radially outward direction. The upward extending portion 58 is a stepped portion that is bent upward toward the radially outer side of the second arm body 54. In FIG. 5, the upward extending portion 58 extends linearly over the entire width of the second arm body 54. The upward extending portion 58 is positioned at an intermediate portion of the second arm body 54 in the extending direction. A portion of the second arm body 54 lying radially inward of the upward extending portion 58 and a portion of the second arm body 54 lying radially outward of the upward extending portion 58 extend in the direction orthogonal to the rotation center line al of the cutter blade 10 (see FIG. 4).

The upward extending portion 58 may be an inclined portion that is inclined upward toward the radially outer side of the second arm body 54. The inclined portion may extend from the intermediate portion of the second arm body 54 in the extending direction to the radially outer end of the second arm portion 36 (the radially outer end of the balance portion 56). Alternatively, the inclined portion may extend from the intermediate portion of the second arm body 54 in the extending direction to an intermediate portion of the balance portion 56 in the extending direction of the second arm portion 36. Further, the inclined portion may be provided only in the second arm body 54 and may not be provided in the balance portion 56.

The balance portion 56 is formed in a portion including a radially outer end portion of the second arm portion 36. The balance portion 56 is formed into a quadrangular shape in plan view. The balance portion 56 protrudes in the reverse rotation direction from a radially outer end 60 of a rear edge portion of the second arm body 54. The balance portion 56 extends in the direction orthogonal to the rotation center line al of the cutter blade 10. That is, in the horizontal placement state of the cutter blade 10, the balance portion 56 extends along the horizontal direction. Therefore, the balance portion 56 does not function as a wing portion that generates an ascending air current.

A second blade portion 62 capable of cutting grass is formed at a front edge portion of the second arm portion 36. The second blade portion 62 is a second base blade 62a extending in the direction orthogonal to the rotation center line al of the cutter blade 10. The second blade portion 62 extends from the second arm body 54 to a radially outer end of the balance portion 56. A radially outer end 64 of the second blade portion 62 is offset from a radially inner end 66 of the second blade portion 62 in the reverse rotation direction. In other words, the shortest distance D3 between the radially outer end 64 of the second blade portion 62 and the line segment L is shorter than the shortest distance D4 between the radially inner end 66 of the second blade portion 62 and the line segment L.

The radially inner end 66 of the second blade portion 62 is positioned radially outward of the upward extending portion 58. As shown in FIG. 4, in the horizontal placement state of the cutter blade 10, the position of the first base blade 48a in the vertical direction is lower than the position of the second blade portion 62 (the second base blade 62a) in the vertical direction. In the horizontal placement state of the cutter blade 10, the position of the second blade portion 62 (the second base blade 62a) in the vertical direction is lower than the position of the radially outer end 50 of the first blade portion 48 in the vertical direction. When the upward extending portion 58 is an inclined portion, the radially inner end 66 of the second blade portion 62 may be positioned radially outward of the inclined portion, or may be located at an intermediate position on the inclined portion.

That is, in the horizontal placement state of the cutter blade 10, the position of a first portion of the first blade portion 48 in the vertical direction and the position of a second portion of the second blade portion 62 in the vertical direction are different from each other. The distance from the rotation center line al to the first portion and the distance from the rotation center line al to the second portion are equal to each other. In other words, the trajectory that the first portion follows during rotation of the cutter blade 10 and the trajectory that the second portion follows during rotation of the cutter blade 10 coincide with each other in plan view.

An outer portion 68 of the second arm portion 36, which extends radially outward beyond the upward extending portion 58, extends in the direction perpendicular to the rotation center line al of the cutter blade 10. In the horizontal placement state of the cutter blade 10, the position of the outer portion 68 of the second arm portion 36 in the vertical direction is lower than the position of the uppermost end 70 of the wing portion 44.

As shown in FIG. 5, the lower blade member 28 includes a first projection 72 for reinforcement, formed thereon. The first projection 72 extends from the radially outer end of the first arm body 42 to the radially outer end of the second arm body 54. The position, size, and shape of the first projection 72 can be set as appropriate. The first projection 72 may not be formed on the lower blade member 28.

As shown in FIGS. 2 to 4, the upper blade member 30 is manufactured by, for example, plastically deforming a single metal thin plate having a point-symmetric shape, by press working. The upper blade member 30 is made of a metal material such as steel, for example. The constituent material of the upper blade member 30 is not limited to a metal material and may be a resin material or the like.

In FIG. 3, the upper blade member 30 is formed point-symmetrically about the rotation center line al of the cutter blade 10. The upper blade member 30 includes an upper attachment portion 74, a third arm portion 76, and a fourth arm portion 78. The upper attachment portion 74 extends in the direction orthogonal to the rotation center line al of the cutter blade 10. The upper attachment portion 74 is located at a central portion of the upper blade member 30 in the longitudinal direction.

An upper insertion hole 80 and a pair of upper attachment holes 82 are formed in the upper attachment portion 74. The upper insertion hole 80 is located at the center of the upper attachment portion 74. The pair of upper attachment holes 82 are positioned so as to sandwich the upper insertion hole 80 in the longitudinal direction of the upper blade member 30. The upper attachment portion 74 has such a size and shape that the upper attachment portion can be superimposed on the lower attachment portion 32 in close contact with each other.

The third arm portion 76 and the fourth arm portion 78 extend from the upper attachment portion 74 in the radially outward direction. Specifically, the third arm portion 76 and the fourth arm portion 78 extend in mutually opposite directions with the upper attachment portion 74 being centered.

As shown in FIGS. 2 to 4, the third arm portion 76 includes a rising portion 84 and an outward extending portion 86. In the horizontal placement state of the cutter blade 10, the rising portion 84 is inclined obliquely upward from the upper attachment portion 74 toward the radially outer side. The outward extending portion 86 extends in the direction orthogonal to the rotation center line al of the cutter blade 10. That is, in the horizontal placement state of the cutter blade 10, the outward extending portion 86 horizontally extends from the rising portion 84 in the radially outward direction. The outward extending portion 86 is formed so as to become narrower toward the radially outer side (see FIG. 3).

A third blade portion 88 capable of cutting grass is formed at a front edge portion of the outward extending portion 86 of the third arm portion 76. The third blade portion 88 extends linearly over substantially the entire length of the outward extending portion 86 of the third arm portion 76. The third blade portion 88 extends along the longitudinal direction of the upper blade member 30.

The fourth arm portion 78 is formed in the same manner as the third arm portion 76. Therefore, a detailed description of the fourth arm portion 78 will be omitted. A fourth blade portion 90 capable of cutting grass is formed at a front edge portion of the outward extending portion 86 of the fourth arm portion 78. The fourth blade portion 90 is configured similarly to the third blade portion 88.

As shown in FIGS. 2 and 3, the upper blade member 30 is formed with a second projection 92 for reinforcement. The second projection 92 extends from the radially outer end of the rising portion 84 of the third arm portion 76 to the radially outer end of the rising portion 84 of the fourth arm portion 78. The position, size, and shape of the second projection 92 can be set as appropriate. The second projection 92 may not be formed on the upper blade member 30.

Figure 7:
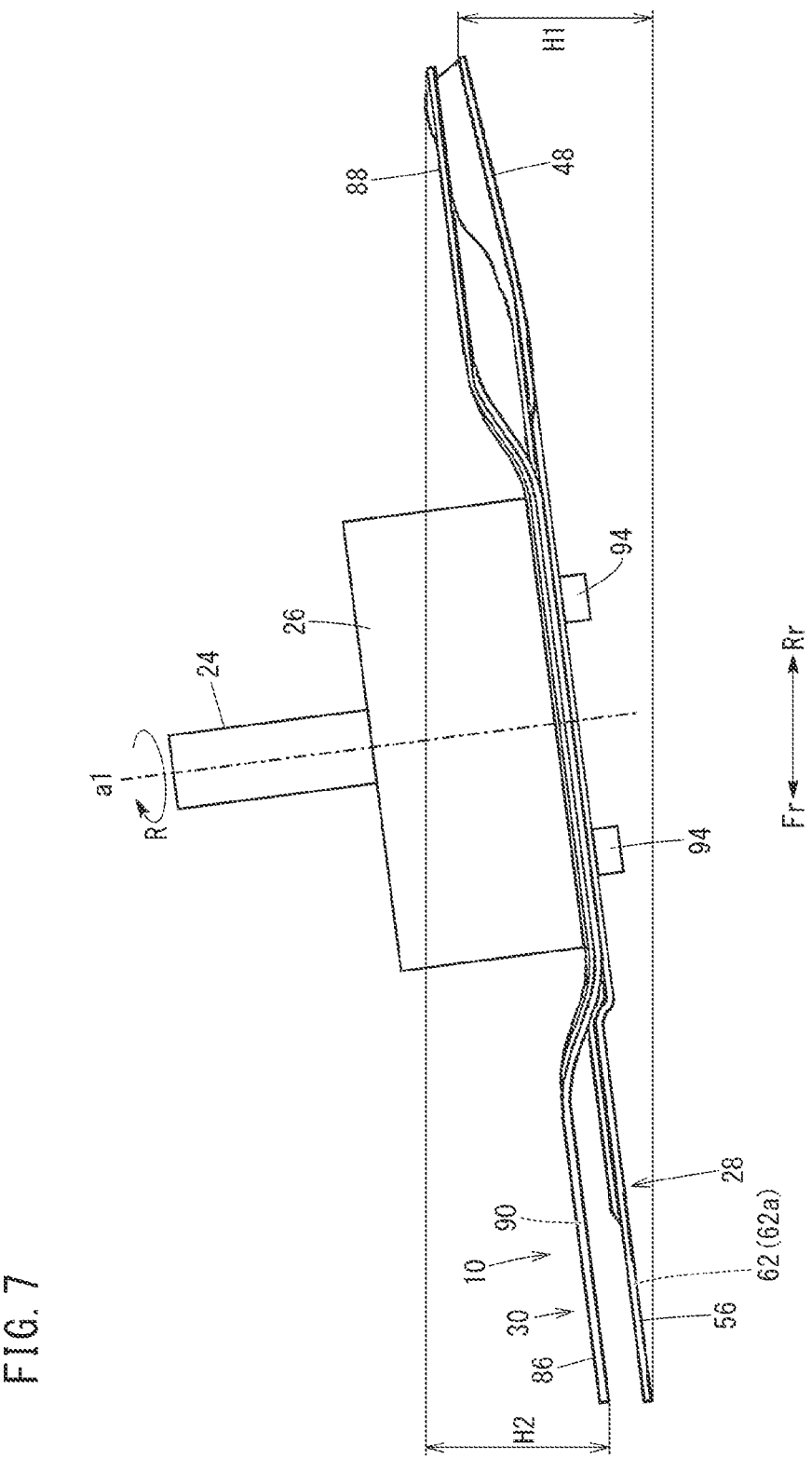
FIG. 7 is an explanatory view of a cutting region of the cutter blade.

As shown in FIG. 7, the lower blade member 28 and the upper blade member 30 are attached to the blade holder 26 by a pair of bolts 94 in a state where the lower blade member 28 and the upper blade member 30 are overlapped with each other (overlapped state). Specifically, as shown in FIGS. 2 and 7, in the overlapping state, the first projection 72 enters the inside of the second projection 92, and the lower surface of the upper attachment portion 74 comes into close contact with the upper surface of the lower attachment portion 32. In the overlapped state, the lower insertion hole 38 and the lower attachment holes 40 communicate with the upper insertion hole 80 and the upper attachment holes 82, respectively (see FIG. 2). The lower end portion of the rotary shaft 24 is inserted into the lower insertion hole 38 and the upper insertion hole 80. The bolts 94 are inserted through the lower attachment holes 40 and the upper attachment holes 82.

As shown in FIG. 3, at least a portion of the outward extending portion 86 of the third arm portion 76 overlaps the first arm portion 34 in plan view, and at least a portion of the outward extending portion 86 of the fourth arm portion 78 overlaps the second arm portion 36 in plan view. The position of the third blade portion 88 is shifted from the position of the first blade portion 48 in the blade rotation direction. The position of the fourth blade portion 90 is shifted from the position of the second blade portion 62 in the blade rotation direction.

As shown in FIG. 4, the outward extending portion 86 of the third arm portion 76 is spaced upward from the first arm portion 34. The outward extending portion 86 of the fourth arm portion 78 is spaced upward from the second arm portion 36. In the horizontal placement state of the cutter blade 10, the position of the uppermost end 70 of the wing portion 44 is higher than the position, in the vertical direction, of the upper surface of the outward extending portion 86 of the third arm portion 76.

In the horizontal placement state of the cutter blade 10, the position in the vertical direction of the lower surface of the radially outer end portion of the third arm portion 76 is higher than the position in the vertical direction of the upper surface of the first arm body 42 by a first distance D5. Further, in the horizontal placement state of the cutter blade 10, the vertical position of the lower surface of the radially outer end portion of the fourth arm portion 78 is higher than the vertical position of the upper surface of the radially outer end portion (balance portion 56) of the second arm portion 36 by a second distance D6. The first distance D5 is greater than the second distance D6.

As shown in FIG. 7, in a state where the cutter blade 10 is attached to the blade holder 26, the rotation center line a1 is inclined rearward of the lawn mower 12, toward the direction of gravity. In this case, during one rotation of the cutter blade 10, the first blade portion 48 and the second blade portion 62 of the lower blade member 28 pass through a first height region H1. As a result, grass (including grass clippings) located within the first height region H1 can be cut by the lower blade member 28.

During one rotation of the cutter blade 10, the third blade portion 88 and the fourth blade portion 90 of the upper blade member 30 pass through a second height region H2. Thus, grass (including grass clippings) located within the second height region H2 can be cut by the upper blade member 30. The size of each of the first height region H1 and the second height region H2 can be appropriately set.

Next, the operation of the lawn mower 12 will be described.

When the cutter blade 10 rotates under the driving action of the prime mover 18, lawn grass grown on the ground Gr directly below the lawn mower 12 is cut by the cutter blade 10. During the rotation of the cutter blade 10, the cutter blade 10 generates an ascending air current by the wing portion 44. Therefore, the grass growing on the ground Gr can be raised by the ascending air current and efficiently cut by the cutter blade 10.

The grass (grass clippings) cut by the cutter blade 10 is convected in the housing 14 by the ascending air current. The cut grass which is convecting is shredded by the cutter blade 10. The shredded grass clippings fall on the ground Gr to serve as a fertilizer for the lawn. In this case, since the shredded grass clippings are less likely to accumulate on the lawn, the appearance of the lawn is improved.

The upper blade member 30 may be omitted from the cutter blade 10. Although a configuration in which the lower blade member 28 includes two arm portions (the first arm portion 34 and the second arm portion 36) has been described in the present embodiment, the number of arm portions included in the lower blade member 28 may be three or more. In this case, the plurality of arm portions are preferably arranged at equal intervals in the blade rotation direction. This arrangement can prevent vibration of the cutter blade 10 during rotation.

In the present embodiment, the case where the wing portion 44 is provided only on the first arm portion 34 has been described as an example, but the present invention is not limited thereto. The wing portion 44 may be provided on each of the first arm portion 34 and the second arm portion 36.

Invention Obtained from Embodiment

The invention that can be grasped from the above embodiment will be described below.

According to an embodiment of the present invention, the cutter blade (10) configured to be rotated by the rotary shaft (24) provided in the lawn mower (12), includes: the attachment portion (32) attached to the rotary shaft; and the first arm portion (34) and the second arm portion (36) each extending from the attachment portion in the radially outward direction of the rotary shaft, wherein the first arm portion includes the first blade portion (48) configured to cut grass, the second arm portion includes the second blade portion (62) configured to cut the grass, the position of the first portion of the first blade portion in the vertical direction and the position of the second portion of the second blade portion in the vertical direction are different from each other in the horizontal placement state in which the cutter blade is placed in a manner so that the rotation center line (a1) of the cutter blade extends along the vertical direction, and the distance from the rotation center line to the first portion and the distance from the rotation center line to the second portion are equal to each other.

With such a configuration, the first portion and the second portion, which are at the same distance from the rotation center line of the cutter blade, can be made different, from each other, in height position at which grass (including grass clippings) is cut, and thus the grass can be efficiently shredded.

In the above-described cutter blade, the first arm portion and the second arm portion may extend in directions opposite to each other with the attachment portion being centered.

With such a configuration, couple unbalance of the cutter blade can be suppressed, and thus vibration of the cutter blade during rotation can be suppressed.

In the above-described cutter blade, the second arm portion may be formed with an upward extending portion (58) extending upward toward the radially outward direction, and in the second arm portion, the second blade portion may be located more outward in the radially outward direction than the upward extending portion.

With such a configuration, with a simple configuration, the position of the first portion of the first blade portion in the vertical direction and the position of the second portion of the second blade portion in the vertical direction can be made different from each other in the horizontal placement state of the cutter blade.

In the above-described cutter blade, at least a part of the first blade portion may extend along a direction in which the second blade portion extends.

With such a configuration, since at least a part of the first blade portion extends along the direction in which the second blade portion extends, it is possible to suppress the occurrence of torsion of the cutter blade during rotation of the cutter blade.

The above-described cutter blade may further include the lower blade member (28) and the upper blade member (30) arranged so as to overlap each other in a thickness direction, wherein the attachment portion, the first arm portion, and the second arm portion may be provided on the lower blade member, the upper blade member may include: the upper attachment portion (74) attached to the rotary shaft in a state of being superimposed on the attachment portion; and the third arm portion (76) and the fourth arm portion (78) each extending from the upper attachment portion in the radially outward direction, the third arm portion may include the third blade portion (88) configured to cut the grass, and the fourth arm portion may include the fourth blade portion (90) configured to cut the grass.

With such a configuration, relatively long grass can be cut simultaneously by the first blade portion and the second blade portion of the lower blade member and the third blade portion and the fourth blade portion of the upper blade member. Further, the lawn grass can be shredded more efficiently.

In the above-described cutter blade, at least one of the first arm portion or the second arm portion may include the wing portion (44) that is inclined upward, toward the reverse rotation direction opposite to the blade rotation direction which is the rotation direction of the cutter blade.

With such a configuration, when the cutter blade is rotated, an ascending air current can be generated by the wing portion. As a result, the grass can be raised by the ascending air current, so that the grass can be cut efficiently. Further, since the grass clippings can be convected by the ascending air current, the grass clippings can be shredded.

In the above-described cutter blade, the wing portion may be provided only on the first arm portion of the first arm portion and the second arm portion.

With such a configuration, since the wing portion is provided only on the first arm portion of the first arm portion and the second arm portion, air resistance received by the cutter blade can be reduced as compared with a case where the wing portions are provided on both the first arm portion and the second arm portion. Therefore, energy consumption (power consumption) during rotation of the cutter blade can be suppressed.

According to another aspect of the present invention, there is provided a lawn mower including the cutter blade described above.

In the above-described lawn mower, the rotary shaft may be inclined rearward in a traveling direction of the lawn mower, toward the gravity direction.

With such a configuration, the height range within which the cutter blade can cut the lawn grass can be widened as compared with the case where the rotary shaft extends along the vertical direction. Therefore, the grass clippings can be shredded more efficiently.

Note that the present invention is not limited to the above-described disclosure, and various configurations can be adopted without departing from the essence and gist of the present invention.

The invention claimed is:

1. A cutter blade configured to be rotated by a rotary shaft provided in a lawn mower, the cutter blade comprising:
    an attachment portion attached to the rotary shaft; and
    a first arm portion and a second arm portion each extending from the attachment portion in a radially outward direction of the rotary shaft,
    wherein
    the first arm portion includes a first blade portion configured to cut grass,
    the second arm portion includes a second blade portion configured to cut the grass,
    the first blade portion includes a first base blade and an inclined blade,
    the first base blade extends in a direction orthogonal to a rotation center line of the cutter blade,
    the first base blade is formed at a front edge portion of the first arm portion,
    in a horizontal placement state in which the cutter blade is placed in a manner so that the rotation center line of the cutter blade extends along a vertical direction, the inclined blade is inclined upward, in a radially outward direction from a radially outer end of the first base blade,
    in the horizontal placement state, a position of the first base blade in the vertical direction is lower than a position of the second blade portion in the vertical direction, and the position of the second blade portion in the vertical direction is lower than a position of a radially outer end of the first blade portion.

2. The cutter blade according to claim 1, wherein the first arm portion and the second arm portion extend in directions opposite to each other with the attachment portion being centered.

3. The cutter blade according to claim 1, wherein the second arm portion is formed with an upward extending portion extending upward toward the radially outward direction, and
    in the second arm portion, the second blade portion is located more outward in the radially outward direction than the upward extending portion.

4. The cutter blade according to claim 1, wherein at least a part of the first blade portion extends along a direction in which the second blade portion extends.

5. The cutter blade according to claim 1, further comprising:
    a lower blade member and an upper blade member arranged so as to overlap each other in a thickness direction, wherein the attachment portion, the first arm portion, and the second arm portion are provided on the lower blade member, the upper blade member includes:

an upper attachment portion attached to the rotary shaft in a state of being superimposed on the attachment portion; and a third arm portion and a fourth arm portion each extending from the upper attachment portion in the radially outward direction, the third arm portion includes a third blade portion configured to cut the grass, and the fourth arm portion includes a fourth blade portion configured to cut the grass.

6. The cutter blade according to claim 1, wherein at least one of the first arm portion or the second arm portion includes a wing portion that is inclined upward, toward a reverse rotation direction opposite to a blade rotation direction which is a rotation direction of the cutter blade.

7. The cutter blade according to claim 6, wherein the wing portion is provided only on the first arm portion among the first arm portion and the second arm portion.

8. A lawn mower comprising the cutter blade according to claim 1.

9. The lawn mower according to claim 8, wherein the rotary shaft is inclined rearward in a traveling direction of the lawn mower, toward a direction of gravity.

\* \* \* \* \*